| LINE VOLTS AC | COIL VOLTS DC | RELAY OPERATION | TRANSFORMER PRIMARY TAP |
|---|---|---|---|
| 40 | 20 | OFF | 230 V. |
| 75 | 36 | " | " |
| 100 | 41 | ON | 115 V. |
| 110 | 41 | " | " |
| 125 | 40 | " | " |
| 150 | 30 | OFF | 230 V. |
| 185 | 20 | " | " |
| 210 | 10 | " | " |
| 230 | 0 | " | " |

INVENTORS.
LANDO K. MOYER
GARVIN B. VAN WALDRON, JR.

BY Harry M. Saragovitz
Edward J. Kelly, Herbert Berl
& S. Dubroff

ATTORNEYS

United States Patent Office 3,348,132
Patented Oct. 17, 1967

3,348,132
AUTOMATIC FAIL-SAFE DUAL-VOLTAGE
POWER SUPPLY CIRCUIT
Lando K. Moyer, Bedminster, and Garvin B. Van Waldron, Jr., Lansdale, Pa., assignors, by mesne assignments, to the United States of America as represented by the Secretary of the Army
Filed Nov. 2, 1964, Ser. No. 408,434
4 Claims. (Cl. 323—43.5)

ABSTRACT OF THE DISCLOSURE

A dual-voltage alternating-current source is adapted to supply a single-voltage utilization means by tap-changing transformer coupling controlled by a relay having an operating coil energized through voltage-dropping series resistor means from rectified direct current derived from the source. The high-voltage tap setting is normal and is changed to low voltage by energizing the relay coil at its normal voltage. Zener diodes, poled in opposition to the rectified direct current, are connected in series with the voltage-dropping resistor means to conduct if the supply voltage rises appreciably toward or to the higher value. This effects a high voltage drop through the series resistors which are also in circuit with the relay coil, thereby causing the latter to fall off in its holding power and the relay to open. This provides the higher voltage tap setting and normal alternating current output voltage to the utilization means from the higher voltage supply.

---

Figures 1, 2:
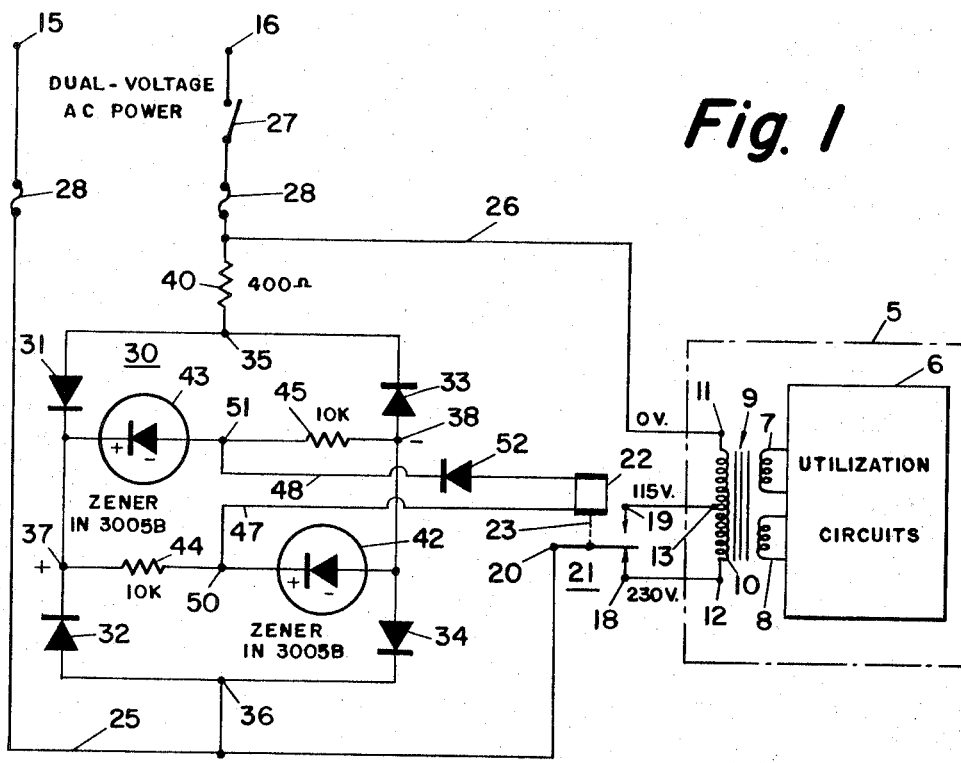

The present invention relates to power supply circuits for electrical and electronic equipment of the type adapted for connection with alternating-current power sources at different supply voltages. The utilization circuits in such equipments operate at generally fixed voltage levels whereas the available power supply may vary between or be furnished at different voltage levels to which the equipments must readily adapt for greater usefulness, and safety from overload or burn-out due to over-voltage power application thereto. This is particularly true of portable and like electrical and electronic test equipments which contain delicate circuit components and sensitive instruments and operate generally on power supply circuits at either of the standard 115-volt or 230-volt levels.

It is an object of this invention to provide an improved power supply circuit for electrical and electronic equipment of the type referred to, which automatically adapts for operation at different higher and lower supply voltage levels and fail-safe operation at the higher level upon deenergization.

It is also an object of this invention to provide an improved dual-voltage power supply circuit for electrical and electronic equipment of the type referred to, utilizing transformer or transformerless design, and a fail-safe dual-voltage control circuit therefor of improved simplicity and effectiveness.

In accordance with one form of the invention, a power supply transformer for utilization circuits of an electrical equipment item is provided with a dual-voltage primary connection to an A-C power source through the contacts of a tap-changing switch or relay, the operating coil of which is energized by rectified D-C current from said source. A pair of Zener diodes and a pair of voltage-dropping resistors, are included in the supply connections for the relay coil to control the operating voltage applied thereto in response to changes in the voltage of the power supply source.

The Zener action of the diodes and associated dropping resistors is such that a lower one of two operating voltages, such as 115 volts AC, at this supply source or input circuit, causes maximum current through the relay coil, and a relay or switch connection with the lower voltage tap on the transformer primary.

Alternating-current input voltage at the higher level, such as 230 volts, causes an unblocking by the Zener action of the diodes and reduced or no voltage on the relay coil by increased voltage drop in the coil circuit. Supply line or power source voltage is then applied to the full primary or higher-voltage tap through the relay or switch connection. The change-over operation of the relay occurs at an intermediate voltage in the event the applied supply voltage changes during operation between the normal voltage levels. The relay or switch connection thus fails safe in the event of power failure since this results in zero voltage on the relay coil also. The Zener diode action controlling the D-C voltages applied applied to the relay or switch operating coil determines how the input power supply voltage is applied to the primary through the relay or tap-changing contacts.

The invention will further be understood from the following description, when considered in connection with the accompanying drawing, and its scope is pointed out in the appended claims.

In the drawing:

FIG. 1 is a schematic circuit diagram of electronic equipment of the type adapted for connection with alternating-current power supply sources at different voltages and a dual voltage power supply system therefor embodying the invention, and FIG. 2 is a table of data illustrating the Zener control action which takes place in the system of FIG. 1 in response to supply voltage change.

Referring to FIG. 1 of this drawing, a piece of electrical or electronic equipment, such as electronic test equipment for use on alternating-current supply voltages at two different standard and intermediate levels, is indicated at 5 by the dash-and-dot rectangular outline, and is provided with internal power utilization circuits represented by the block 6. The latter are connected with suitable secondary windings, such as 7 and 8, of a power supply transformer 9 for the equipment. The primary winding 10 of the transformer is provided with a common, or zero-voltage, terminal 11 at one end and a higher, 230-volt, tap 12 at the opposite end. An intermediate, lower-voltage tap 13 is provided on the primary for normal 115 volt power input in the present example, where it is assumed that the upper supply voltage is 230 volts. In the case of test equipment it may be assumed also that it may operate on supply voltages as above and at frequencies from 55 to 410 cycles.

Suitable alternating-current power as above noted, may be applied to the equipment through a pair of input terminals 15 and 16 which may be of any type, such as the wall-outlet plug-in type, adapted for connection with conventional A-C power sources. A dual-voltage primary connection to the terminals 15 and 16 and an A-C power source is provided for the equipment supply transformer 9 through the contacts 18, 19 and 20 of a tap-changing switch or relay 21 having an operating winding or coil 22 for the contacts. The contact 18 is connected with the higher-voltage primary terminal 12 and is fixed, as is the contact 19 connected to the lower voltage tap 13.

The contact 20 is movable from a position of rest, with the relay OFF and the coil 22 deenergized, as shown, in connection with the fixed contact 18, to an alternative connection with the other fixed contact 19, with the relay ON and the coil 22 energized with operating current at the proper voltage level. In the present example the movable contact 20 is operated by connection, as indicated, with a solenoid plunger or movable core 23 operating in the coil 22, and is connected through a supply lead 25 with the input or power supply terminal 15. The other input or power supply terminal 16 is connected with the common or zero-voltage terminal 11 of the primary winding through a second power supply lead 26. The latter is provided with a power switch 27 for the equipment, and both supply leads are preferably protected by fuses 28 therein, as shown, for the equipment. The tap-changing relay or switch thus normally provides the higher-voltage connection for the power source or supply terminals 15 and 16 with the primary terminal 12 and the full primary winding, and thus protects the equipment from over voltage power application when connected with a supply source.

Control or operating voltage for the switching or relay coil 22 is applied thereto through a control circuit or network 30 from the power source or input terminals 15–16. This includes a full-wave bridge rectifier comprising four diode rectifiers 31, 32, 33, and 34 connected between opposite input junction terminals 35 and 36 and opposite output junction terminals 37 and 38 in symmetrical full-wave rectifying polarity relation as indicated. Thus the output terminals 37 and 38 are positive and negative, respectively, as indicated, in the present circuit. The input terminal 36 is connected with the supply lead 25 and the input terminal 35 is connected with the supply lead 26 through a current-limiting series resistor 40 for the control network 30. This prevents heavy current flow in case of abnormally high supply voltage or diode rectifier breakdown in operation.

The rectified D-C output voltage at the terminals 37 and 38 is thus responsive to changes in the alternating-current supply voltage applied at the input terminals 15 and 16, and provides the basic control or operating voltage for the switching or relay coil 22 in the control network 30. This voltage is further modified and controlled by additional elements of the network comprising two Zener reference diodes 42 and 43, and two voltage-dropping or voltage-control resistors 44 and 45. The diodes may be of the commercial 100-volt, IN3005B, silicon type, and the resistors may have a wattage rating of 3–4 watts at 10,000 ohms, in the present example.

The control voltage circuit between the terminals 37 and 38 and the relay coil 22 includes the coil leads 47 and 48 connected respectively to the terminals 37 and 38 through respective resistors 44 and 45, whereby, upon energization of the equipment, D-C current flows from the positive terminal 37 through the first dropping resistor 44 and the coil lead 47, thence through the coil 22 and the lead 48 to the second resistor 45, and from the resistor 45 to the negative terminal 38. In addition to the series resistor connections to the respective terminals 37 and 38, each of the coil leads or the resistors and diode junctions, are connected with the opposite terminal through one of the Zener diodes.

In the present example, the first Zener diode 42 is connected between a junction terminal 50 for the coil lead 47 and the negative terminal 38, and the second Zener diode 43 is connected between a terminal 51 for the coil lead 48 and the positive terminal 37. Both diodes are in the same reverse-bias polarity relation in connection with the positive and negative terminals 37 and 38 for current conduction in the reverse direction at substantially constant voltage drop as is normal, after the breakdown voltage is reached. A normal diode rectifier 52 may be included in circuit with the coil 22 between the terminals 50 and 51 as a protective element for the circuit components, including the coil, against reactive surges and transients or the effects of individual component breakdown. In the present example it is connected for current conduction in the forward direction in the lead 48, and may be provided by a commercial IN 538 type diode. The rectifying diodes 31–34 may be of the commercial IN 540 type, although any suitable type may be used for deriving the full-wave rectification, and for faithful response to amplitude or level changes in the applied supply voltage at the control voltage terminals 37 and 38.

The control circuit or network 30, through which control voltage is applied to the relay coil, may be considered to have two parallel branches between the control voltage supply terminals 37 and 38. The first voltage-dropping resistor 44 is connected serially in a first branch, from the positive supply terminal 37 through the first Zener diode 42 with the negative supply terminal 38. The second voltage-dropping resistor 45 is connected from the negative terminal 38 through the second Zener diode 43 with the positive terminal 37. With this circuit arrangement it will be seen that the normal voltage drop through the resistors 44 and 45 due to coil current alone may be relatively low and that when the Zener diodes conduct reverse current, this adds materially to the normal drop and reduces the voltage at the effective coil terminals, that is, the terminals 50 and 51 at the junctions of the series-connected resistors and Zener diodes.

The operation of the power supply system and the control network, in response to a full range of applied supply voltages, below and between the normal dual-voltage levels, is indicated by the tabulated data in FIG. 2, to which attention is directed, along with FIG. 1. As the line voltage or the supply voltage at the input terminals 15–16 is raised in steps from 40 volts, for example, to the upper 230 volt level, the D-C voltage across the relay coil 22 increases correspondingly and the relay is OFF initially. The contacts 20 and 18 are closed to provide the 230 volt primary connection and protection for the system, with the relay coil voltage below the contact-operating level of substantially 40 volts, in the present example.

At from 100 volts to 125 volts at the terminals 15 and 16, the D-C voltage at the junction or effective coil terminals 50–51 rises sufficiently for the relay or tap-changing switch to operate in connection with the 115 volt tap 13 as the coil moves the contact 20 to close with the contact 19. The utilization circuits 6 are then operated at the proper voltages. The Zener diodes keep the current flow through the parallel branches blocked or at zero as long as the Zener breakdown voltage across the diodes is not reached. At these points the relay is ON and the 115 volt tap connection is in operation. However, from the table in FIG. 2 it will be noted that the D-C coil voltage has started to drop from 41 to 40 volts, and indicates that the Zener action, or breakdown to reverse current flow, is taking place at this point to draw more current through the dropping resistors 44 and 45. This lowers the voltage at the terminals 50 and 51. At the next reading of 150 volts input at the terminals 15–16, the relay is OFF again because of low coil voltage, below the pickup point, and the contacts 20 and 18 once more close to establish the higher voltage primary tap connection. Generally the applied voltage is either 115 volts or 230 volts in this type of equipment. The interim readings merely show that above the lower operating voltage level the protective switch-over takes place within a safe margin, and at the full upper level the coil voltage is zero with the circuit shown.

Should the power supply be cut off or the terminals 15–16 be disconnected from the wall outlet or other point of supply, the relay will remain deenergized and OFF for the safe reapplication of the supply voltage at either level, and thus with safety to the equipment. If the supply voltage is at the lower level, the ON condition will immediately be attained in accordance with the conditions indicated in FIG. 2. If the supply voltage is at the higher level, the OFF condition with the relay OFF, or deenergized, will be maintained as indicated. This table serves as one example of how the Zener action affects the control voltage on the relay coil and the application of different input voltage levels to the transformer primary, to the end that the equipment utilization circuits receive substantially the same normal operating voltages.

Thus the system described provides for improved dual-voltage operation of electrical and electronic equipments with which it is used. It automatically adapts for operation at different higher and lower supply voltage levels, and fails safe for operation at the higher level when disconnected or deenergized. At the same time the system is simple in circuit structure and effective in operation under changing supply voltage levels.

We claim:
1. A power supply system for applying operating currents to power utilization circuits of alternating-current equipment at substantially fixed voltage levels in response to power-supply voltage at two different higher and lower voltage levels comprising, a power supply transformer having a secondary winding adapted to be connected with said utilization circuits to apply said operating currents thereto and having a primary winding with tap connections thereon for operation at said different power input-voltage levels, a tap-changing relay having a direct-current operating coil and contacts connected with the primary winding to provide the higher-level tap connection with the coil deenergized and the lower-level tap connection with the coil energized above a predetermined direct-current operating level, a pair of alternating-current supply leads for said system connected with said primary winding and the tap connections thereon through said relay contacts, rectifier means connected between said supply leads and said relay coil for energizing said coil in response to alternating-current supply voltage at the lower voltage level, voltage-dropping resistor elements connected serially in circuit between said relay coil and said rectifier means, and zener diode elements connected with the resistor elements to draw reverse current therethrough from said rectifier and thereby reduce the voltage on the coil below the said operating level in response to supply voltages at the higher voltage level, thereby to provide the higher-level tap connection, and protect said utilization circuits from over-voltage operation.

2. A power supply system as defined in claim 1, wherein the rectifier means is provided with positive and negative direct-current output terminals, and wherein two parallel branch circuits are provided between said terminals with one voltage-dropping resistor element and one Zener diode element serially connected in each branch and with the relay coil connected between the junctions of the resistor and diode elements.

3. A power supply system as defined in claim 2, wherein a protective diode is connected in series and directly with the relay coil for forward conduction, and wherein the rectifier means comprises four diode elements connected in full-wave rectifying bridge relation and a series current-limiting input resistor.

4. In a power supply system for electrical and electronic equipment of the plug-in dual-voltage alternating-current type, the combination with a power supply transformer having primary taps for operations at higher and lower supply voltage levels, of a tap-changing relay therefor connected to provide for power supply at the higher voltage level, said relay having an operating coil responsive to a direct-current voltage of predetermined magnitude for changing said connection for power supply to the transformer at the lower voltage level, a control circuit for said relay comprising a full-wave bridge rectifier having positive and negative direct-current output terminals and connected to receive energization with said transformer from an alternating-current supply source, a first voltage-dopping resistor and a first Zener diode serially connected in the order named from the positive to the negative rectifier terminal, a second Zener diode and a second voltage-dropping resistor serially connected in the order named from said positive to said negative terminal, thereby providing parallel branches in said control circuit, said Zener diodes being connected for reverse current conduction therethrough above the Zener voltage to draw voltage-dropping current through said resistors, and means providing an operating and control connection through the relay coil from one control circuit branch to the other between the diode and resistor junctions.

References Cited
UNITED STATES PATENTS

| | | | |
|---|---|---|---|
| 2,680,832 | 6/1954 | Schultz | 323—43.5 |
| 2,728,046 | 12/1955 | Sciaky | 323—58 |
| 2,839,718 | 6/1958 | Luftman et al. | 323—43.5 |
| 3,102,226 | 8/1963 | Borkovitz | 323—22 |

JOHN F. COUCH, *Primary Examiner.*

W. E. RAY, *Examiner.*